(12) United States Patent
Yoshitani (10) Patent No.: US 9,891,604 B2
(45) Date of Patent: Feb. 13, 2018

(54) POWER CONTROL APPARATUS, POWER CONTROL SYSTEM, AND CONTROL METHOD

(71) Applicant: KYOCERA CORPORATION, Kyoto (JP)

(72) Inventor: Naohisa Yoshitani, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 637 days.

(21) Appl. No.: 14/364,375

(22) PCT Filed: Dec. 12, 2012

(86) PCT No.: PCT/JP2012/082239
§ 371 (c)(1),
(2) Date: Jun. 11, 2014

(87) PCT Pub. No.: WO2013/089150
PCT Pub. Date: Jun. 20, 2013

(65) Prior Publication Data
US 2014/0350700 A1 Nov. 27, 2014

(30) Foreign Application Priority Data

Dec. 12, 2011 (JP) .................................. 2011-271750

(51) Int. Cl.
*G05B 15/02* (2006.01)
*H04W 76/04* (2009.01)
(Continued)

(52) U.S. Cl.
CPC ............. *G05B 15/02* (2013.01); *G06Q 10/04* (2013.01); *H04L 12/2818* (2013.01);
(Continued)

(58) Field of Classification Search
CPC ..... G05B 15/02; G06Q 10/04; H04L 12/2818; H04L 67/325; H04L 2012/2841; H04W 4/08; H04W 76/048; H04W 84/20
See application file for complete search history.

(56) References Cited

U.S. PATENT DOCUMENTS 4,969,147 A * 11/1990 Markkula, Jr. ..... G05B 19/0421
370/400
8,244,405 B2 * 8/2012 Kao ...................... G05B 15/02
361/42
(Continued)

FOREIGN PATENT DOCUMENTS

GB 2479060 A 9/2011
JP S62-296632 A 12/1987
(Continued)

OTHER PUBLICATIONS

Office Action dated Dec. 15, 2015, issued in counterpart Japanese Application No. 2013-549290.
(Continued)

*Primary Examiner* — Kenneth M Lo
*Assistant Examiner* — Michael J Huntley
(74) *Attorney, Agent, or Firm* — Procopio Cory Hargreaves and Savitch LLP (57) ABSTRACT

A HEMS (200) connects to a plurality of devices furnished to a consumer's residence, and performs control relating to power management of the plurality of devices. The HEMS (200) is provided with a controller (240) for transmitting control information for the purpose of respective control of the plurality of devices, respectively to the plurality of devices on the basis of a predetermined cycle. The controller (240) classifies the plurality of devices into a plurality of
(Continued)

groups, transmitting the control information to devices respectively classified into the plurality of groups, at different timing for each group.

6 Claims, 5 Drawing Sheets

(51) Int. Cl.
  *H04L 12/28* (2006.01)
  *H04L 29/08* (2006.01)
  *H04W 4/08* (2009.01)
  *G06Q 10/04* (2012.01)
  *H04W 84/20* (2009.01)

(52) U.S. Cl.
  CPC ............ *H04L 67/325* (2013.01); *H04W 4/08* (2013.01); *H04W 76/048* (2013.01); *H04L 2012/2841* (2013.01); *H04W 84/20* (2013.01)

(56) References Cited

U.S. PATENT DOCUMENTS

| | | | |
|---|---|---|---|
| 8,738,044 B1* | 5/2014 | Shetty | H04W 4/08 340/7.1 |
| 2003/0031141 A1* | 2/2003 | Schweinhart | H04B 7/18584 370/316 |
| 2005/0071882 A1* | 3/2005 | Rodriguez | H04H 20/10 725/95 |
| 2006/0225104 A1* | 10/2006 | James | H01Q 1/125 725/68 |
| 2007/0064731 A1* | 3/2007 | Mizutani | H04L 12/5695 370/468 |
| 2008/0133065 A1 | 6/2008 | Cannon et al. | |
| 2009/0174532 A1* | 7/2009 | Galli | H04B 3/544 340/12.32 |
| 2009/0207769 A1* | 8/2009 | Park | H04W 74/04 370/311 |
| 2010/0220653 A1* | 9/2010 | Hwang | H04L 45/24 370/328 |
| 2011/0018704 A1* | 1/2011 | Burrows | H04B 3/54 340/538 |
| 2011/0051645 A1* | 3/2011 | Hong | H04L 45/48 370/311 |
| 2011/0153107 A1 | 6/2011 | Kim et al. | |
| 2012/0163234 A1* | 6/2012 | Sulc | H04L 61/35 370/254 |
| 2012/0250864 A1 | 10/2012 | Nishibayashi et al. | |
| 2013/0013806 A1* | 1/2013 | Woo | H04W 72/005 709/238 |
| 2013/0088968 A1* | 4/2013 | Kim | H04L 47/11 370/235 |
| 2013/0103780 A1* | 4/2013 | Panther | H04L 67/325 709/213 |
| 2013/0201857 A1* | 8/2013 | Bhargava | H04K 3/222 370/252 |
| 2014/0207769 A1* | 7/2014 | Marbach | G06Q 10/04 707/723 |

FOREIGN PATENT DOCUMENTS

| | | | |
|---|---|---|---|
| JP | 2003-259448 A | | 9/2003 |
| JP | 2008-211816 | | 9/2008 |
| JP | 2008211816 | * | 9/2008 |
| JP | 2011-097296 A | | 5/2011 |
| JP | 2011-129085 A | | 6/2011 |
| WO | 2011-062080 A1 | | 5/2011 |
| WO | 2011/064865 A1 | | 6/2011 |

OTHER PUBLICATIONS

International Search Report; PCT/JP2012/082239; Mar. 19, 2013.
Extended European Search Report dated Oct. 20, 2015 issued by the European Patent Office for Counterpart European Application No. EP 12 857 898.6.

* cited by examiner

| EQUIPMENT ID | ID101 | ID102 | ID103 | ID104 | ID105 | ID106 |
|---|---|---|---|---|---|---|
| HOP NUMBER h | h1 = 1 | h2 = 1 | h3 = 2 | h4 = 2 | h5 = 1 | h6 = 1 |

POWER CONTROL APPARATUS, POWER CONTROL SYSTEM, AND CONTROL METHOD

TECHNICAL FIELD

The present invention relates to a power control apparatus that performs control on a power management of equipment, a power control system, and a control method.

BACKGROUND ART

There is known a power control apparatus that controls equipment such as a load and a distributed power source provided in a consumer to achieve optimal energy management (for example, see Patent Literature 1). From among such power control apparatuses, an apparatus that controls a housing is called HEMS (Home Energy Management System).

CITATION LIST

Patent Literature

[PTL 1] Japanese Unexamined Patent Application Publication No. 2011-129085

SUMMARY OF INVENTION

The power control apparatus transmits control information in a predetermined period to a plurality of equipment to control the plurality of equipment, and thus, the transmission of the control information is concentrated at a specific timing. As a result, there is a problem that a congestion is generated in a communication network.

Therefore, the present invention has been achieved in order to resolve the above-described problem, and an object thereof is to provide a power control apparatus with which it is possible to reduce the generation of a congestion in a communication network when control information for controlling equipment is regularly transmitted, a power control system, and a control method.

A power control apparatus according to a first characteristic is connected to a plurality of equipment provided in a consumer to perform control on a power management of the plurality of equipment. The gist of the power control apparatus is that it includes a control unit that transmits, on the basis of a predetermined period, control information for controlling each of the plurality of equipment, to each of the plurality of equipment, wherein the control unit classifies the plurality of equipment into a plurality of groups and transmits the control information to the equipment classified into each of the plurality of groups, at a timing different depending on each group.

The gist of the first characteristic is that the control unit classifies the plurality of equipment into the plurality of groups so that a difference in value, totaled for each group to which the equipment belongs, of a data amount of the control information transmitted to each of the plurality of equipment is minimum.

The gist of the first characteristic is that the power control apparatus is connected, via an ad hoc network, to the plurality of equipment, and the control unit acquires results obtained by multiplication of a data amount of the control information transmitted to each of the plurality of equipment by a hop number of each of the plurality of equipment in the ad hoc network, and classifies the plurality of equipment into the plurality of groups so that a difference in value obtained by totaling the multiplication results for each group to which the equipment belongs is minimum.

The gist of the first characteristic is that the control unit randomly selects equipment included in the plurality of equipment and classifies the plurality of equipment into the plurality of groups.

The gist of the first characteristic is that the control unit classifies the plurality of equipment into the plurality of groups on the basis of identification information assigned to each of the plurality of equipment.

The gist of the first characteristic is that the control unit transmits the control information at a timing different depending on each group, within a predetermined period.

The gist of the first characteristic is that the ad hoc network is a ZigBee network.

The gist of the first characteristic is that the control unit transmits the control information in a period defined in a ZigBee protocol.

A power control system according to a second characteristic includes a plurality of equipment provided in a consumer and a power control apparatus that connects to the plurality of equipment to perform control on a power management of the plurality of equipment. The gist of the power control apparatus is that it includes a control unit that transmits, on the basis of a predetermined period, control information for controlling each of the plurality of equipment, to each of the plurality of equipment, wherein the control unit classifies the plurality of equipment into a plurality of groups and transmits the control information to the equipment classified into each of the plurality of groups, at a timing different depending on each group.

The gist of a control method according to a third characteristic is a control method in a power control apparatus that is connected to a plurality of equipment provided in a consumer and performs control on a power management of the plurality of equipment, comprising: a step A (step S11) of transmitting, on the basis of a predetermined period, control information for controlling each of the plurality of equipment, to each of the plurality of equipment, wherein the step A comprises: a step A1 (step S112) of classifying the plurality of equipment into a plurality of groups; and a step A2 (step S113) of transmitting the control information to the equipment belonging to each of the plurality of groups, at a timing different depending on each group.

According to the present invention, it is possible to provide a power control apparatus with which it is possible to reduce the generation of a congestion in a communication network when control information for controlling equipment is regularly transmitted, a power control system, and a control method.

DESCRIPTION OF EMBODIMENT

Hereinafter, an embodiment according to the present invention will be described with reference to drawings. In the following description of the drawings, the same or similar parts will be denoted by the same or similar reference numerals. It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

First Embodiment

Figure 1:
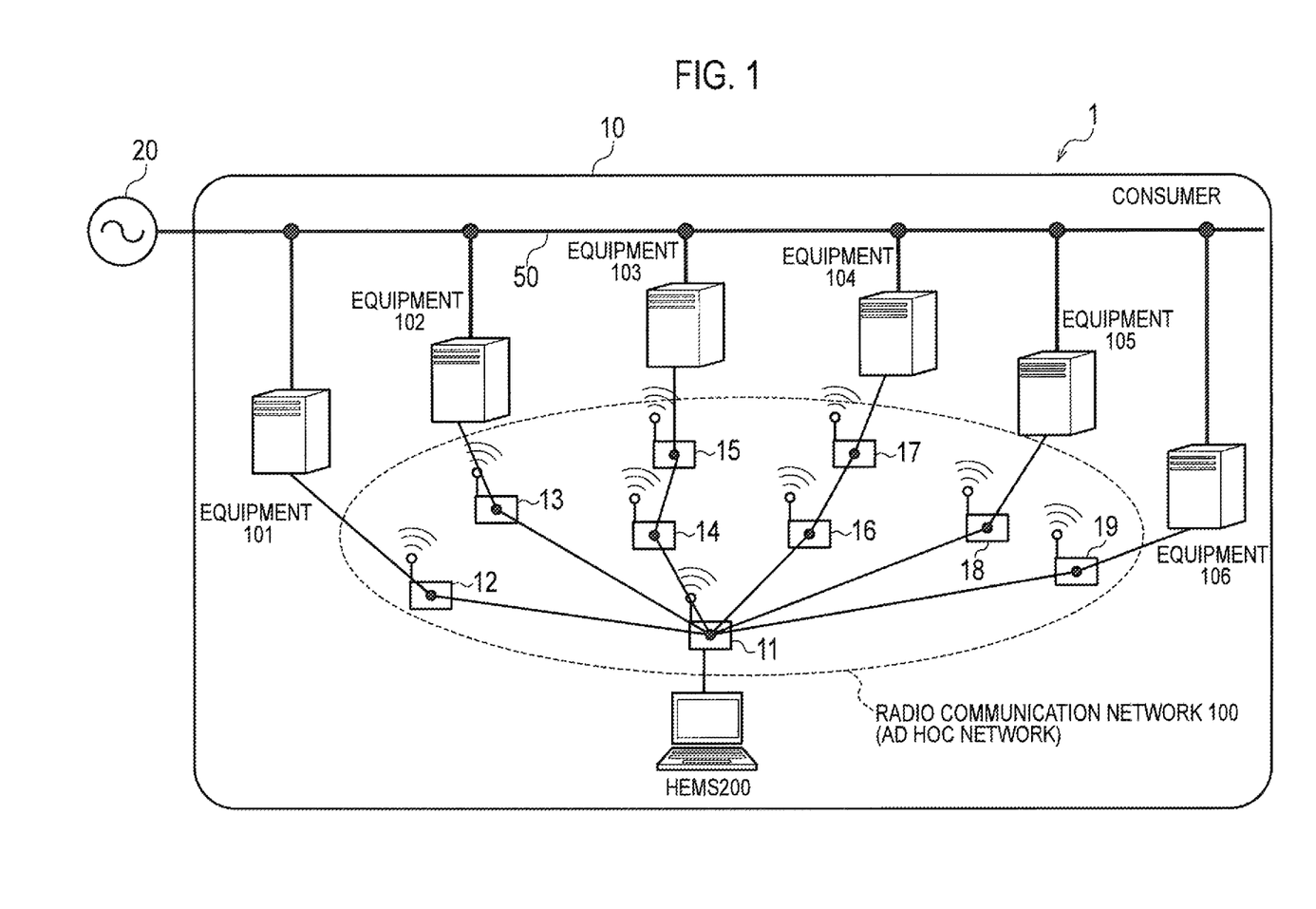
FIG. 1 shows a power control system according to a first embodiment.

A power control system according to a first embodiment will be described. FIG. 1 shows a power control system 1 according to the first embodiment. As shown in FIG. 1, the power control system 1 is provided in a consumer 10. In the present embodiment, the consumer 10 is considered as a housing, for example. The power control system 1 performs control on a power management in the consumer 10 connected to a power grid 20. The power control system 1 includes a plurality of equipment 101 to 106 provided in the consumer 10, and HEMS 200 connected, via a radio communication network 100, to the plurality of equipment 101 to 106.

The plurality of equipment 101 to 106 execute various types of processes in response to an instruction from the HEMS 200. The plurality of equipment 101 to 106 include, for example, a load, a sensor, and a distributed power source provided in the consumer 10. The plurality of equipment 101 to 106 may include another equipment such as a distribution board, in addition to the above.

The load is an apparatus that consumes the power supplied via a power line 50. Examples of the load include an apparatus such as a refrigerator, lighting, an air conditioner, and TV. The load may include a singular apparatus and a plurality of apparatuses.

The sensor may be a temperature sensor that measures a temperature, may be a sensor that measures power consumed in the consumer 10, may be a sensor that measures power supplied from the distributed power source, and may be a sensor that measures power reversely flown from the distributed power source to the grid 20.

The distributed power source is power supply means that supplies the power to equipment in the consumer 10. For example, as the distributed power source, a fuel cell such as SOFC (Solid Oxide Fuel Cell) or PEFC (Polymer Electrolyte Fuel Cell), a power generation apparatus that uses clean energy such as solar light, wind power, and geothermal heat, and a storage battery that accumulates and discharges the power can be contemplated. The storage battery may include a battery for an electric vehicle.

The HEMS 200 is an apparatus (HEMS: Home Energy Management System) that manages the power of the consumer 10, and is an example of a power control apparatus. The HEMS 200 communicates with the equipment 101 to 106 via the radio communication network 100. The radio communication network 100 includes a plurality of relay apparatuses 11 to 19, and configures an ad hoc network. The HEMS 200 communicates with the equipment 101 to 106 via the plurality of relay apparatuses 11 to 19. It is preferable that the HEMS 200 communicates with the equipment 101 to 106 by, for example, a communication scheme that complies with Echonet Lite or a communication scheme that complies with ZigBee (registered trademark) and IEEE 802.15.4.

Figure 2:
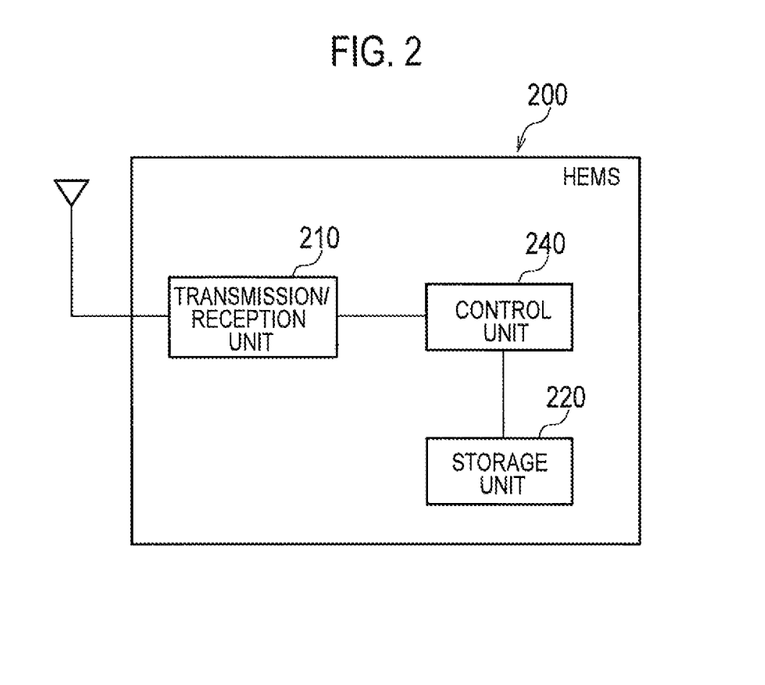
FIG. 2 is a block diagram showing HEMS according to the first embodiment.

As shown in FIG. 2, the HEMS 200 includes a transmission/reception unit 210, a storage unit 220, and a control unit 240.

The transmission/reception unit 210 communicates with the equipment 101 to 106 via the radio communication network 100. The transmission/reception unit 210 converts information input from the control unit 240, which is a higher-level layer, into a format used by the equipment 101 to 104, which are a lower-level layer, for executing a process, and transmits the converted information to the equipment 101 to 106. As described later, in the present embodiment, the transmission/reception unit 210 transmits the control information to the equipment once the control information for controlling the equipment 101 to 106 is input from the control unit 240.

Further, the transmission/reception unit 210 converts information received from the plurality of equipment 101 to 106 into a format used by the control unit 240, which is a higher-level layer, for executing a process, and outputs the converted information to the control unit 240. Specifically, once the response information responding to the control information is received from the plurality of equipment 101 to 106, the transmission/reception unit 210 outputs the response information to the control unit 240. The transmission/reception unit 210 converts these pieces of information into a format that complies with ZigBee (registered trademark) and IEEE 802.15.4. In the present embodiment, the transmission/reception unit 210 configures a communication module that complies with a ZigBee (registered trademark) protocol and IEEE 802.15.4.

The storage unit 220 stores a program executed by the control unit 240, and is used as a work area during execution of the program in the control unit 240.

The control unit 240 controls various types of functions provided in the power control system 1, and includes a CPU, a memory, etc. The control unit 240 controls a process that is executed by the equipment 101 to 106, by an application operating at the higher-level layer.

Specifically, the control unit 240 transmits control information for controlling each of the plurality of equipment 101 to 106, via the transmission/reception unit 210, to each of the plurality of equipment 101 to 106, on the basis of a control period T described later, In this case, the control information includes information for requesting a state (status) for monitoring an operation of each of the plurality of equipment 101 to 106, or information for instructing equipment to perform a process of turning on/off a power supply, generating power, charging and discharging, and switching between heating and cooling, for example. The control information differs depending on each function provided in the equipment 101 to 106, and thus, the above information is not limiting and other various information can be included.

Further, the control information transmitted to each of the equipment 101 to 106 differs depending on a content to control the equipment 101 to 106. Therefore, a data amount (data size) of the control information transmitted to each of the equipment 101 to 106 differs respectively.

The control period T is an example of a predetermined period, and is a period that acts as a reference of timing at which the control unit 240 transmits the control information to the equipment 101 to 106. In the present embodiment, the same control period T is to be set to each of the plurality of equipment 101 to 106. The control period T may be set differently in response to each timing to control the equipment 101 to 106.

Further, when transmitting the control information, the control unit 240 classifies the plurality of equipment 101 to 106 into a plurality of groups, and transmits the control information to the equipment classified into each of the plurality of groups, at a timing different depending on each group.

A method of classifying, by the control unit 240 according to the present embodiment, the plurality of equipment 101 to 106 into a plurality of groups will be described, below. Firstly, the control unit 240 acquires a data amount of the control information transmitted to each of the plurality of equipment 101 to 106.

In this case, in the present embodiment, description proceeds while the control information transmitted to each of the plurality of equipment 101 to 106 are control information A to F and the data amount of each item of the control information A to F is data amounts Da to Df. Further, description proceeds on the assumption that three groups G1 to G3 are previously defined as the plurality of groups. The number of groups is not limited to three.

Firstly, the control unit 240 compares each of the data amounts Da to Df to classify the control information A to F corresponding to each of the data amounts Da to Df into three groups G1 to G3. At this time, the control unit 240 classifies the information so that a difference in total value of the data amounts classified into each of the three groups G1 to G3 is minimum. That is, the control unit 240 distributes the information so that the total value of the data amounts classified in each of the three groups G1 to G3 is equal.

Specifically, for example, when the data amount Da of the control information A is 10 byte, the data amount Db of the control information B is 20 byte, the data amount Dc of the control information C is 30 byte, the data amount Dd of the control information D is 40 byte, the data amount De of the control information e is 50 byte, and the data amount Df of the control information F is 60 byte, the control unit 240 distributes the control information A to F, as follows. The control unit 240 distributes the control information A (data amount Da: 10 byte) and the control information F (data amount Df: 60 byte) into the group G1. The control unit 240 distributes the control information B (data amount Db: 20 byte) and the control information E (data amount De: 50 byte) into the group G2. The control unit 240 distributes the control information C (data amount Dc: 30 byte) and the control information D (data amount Dd: 40 byte) into the group G3. That is, the control unit 240 distributes the control information A to F so that the total value of the data amounts of the control information of each group is 70 byte, respectively.

Further, the control unit 240 transmits the control information A to F to the plurality of equipment 101 to 106 at a timing different depending on each group, within the control period T. Specifically, the control unit 240 equally divides the control period T into three so as to correspond to the three groups G1 to G3 and specifies a plurality of periods t1 to t3. The control unit 240 transmits the control information A to F corresponding to each of the three groups G1 to G3 to match a timing at which each of the periods t1 to t3 elapses after a start of the control period T. That is, the control unit 240 disperses the transmission timings into the plurality of periods t1 to t3 corresponding to each of the three groups G1 to G3, and transmits the control information A to F to the plurality of equipment 101 to 106.

(Control Method)

Figure 3:
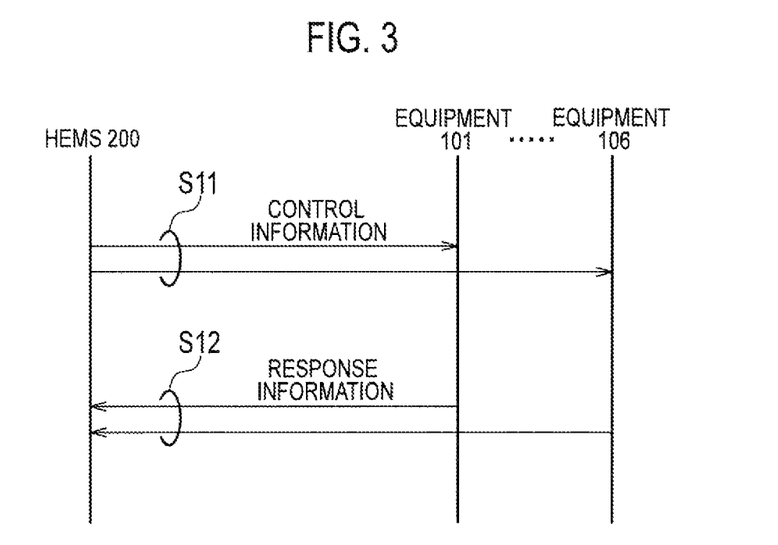
FIG. 3 is a sequence diagram showing a control method according to the first embodiment.

Next, a control method according to the present embodiment will be described. FIG. 3 is a sequence diagram showing a control method according to the first embodiment. Specifically, FIG. 3 shows an operation when the HEMS 200 according to the present embodiment transmits the control information to the plurality of equipment 101 to 106 on the basis of the control period T.

In step S11, in the HEMS 200, the control unit 240 transmits the control information to each of the plurality of equipment 101 to 106 on the basis of the control period T. At this time, the control unit 240 classifies each of the plurality of equipment 101 to 106 into a plurality of groups and then transmits the control information. Such an operation will be described in detail later.

In step S12, in the HEMS 200, the control unit 240 receives response information from the equipment 101 to 106. The response information includes process results in the equipment 101 to 106 or information indicating a state (status). The control unit 240 comprehends the operation of each of the plurality of equipment 101 to 106, on the basis of the response information.

Thereafter, the control unit 240 is also capable of executing retransmission control to retransmit the control information when the response information responding to the control information is not received from the plurality of equipment 101 to 106 within a predetermined time-out period.

Figure 4:
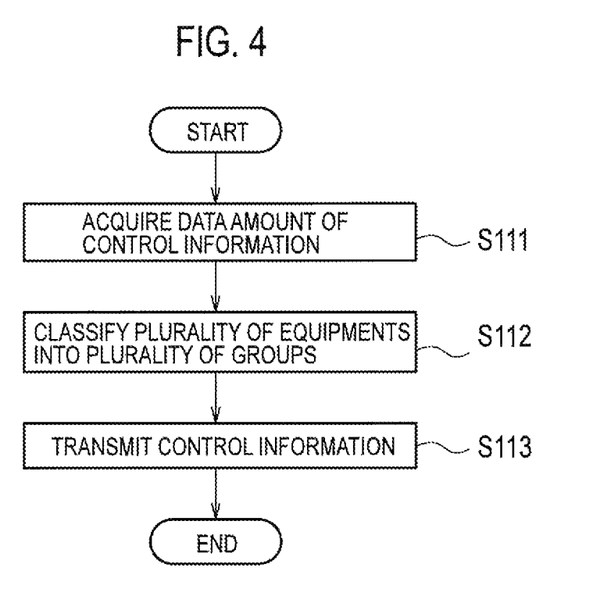
FIG. 4 is a flowchart showing the control method according to the first embodiment.

Next, the control executed by the control unit 240 in step S11 will be described with reference to FIG. 4. FIG. 4 is a flowchart showing a control method in step S11 of FIG. 3.

In step S111, the control unit 240 acquires the data amounts Da to Df of the control information A to F transmitted to the plurality of equipment 101 to 106.

In step S112, the control unit 240 compares each of the data amounts Da to Df to classify the control information A to F corresponding to the data amounts Da to Df into three groups G1 to G3. At this time, the control unit 240 classifies the control information A to F so that a difference in total value of the data amounts classified into each of the three groups G1 to G3 is minimum. In this way, when the control unit 240 classifies the control information A to F into each of the three groups G1 to G3, the plurality of equipment 101 to 106 transmitting the control information A to F are classified into the three groups G1 to G3.

In step S113, the control unit 240 transmits the control information A to F corresponding to the three groups G1 to G3 to each of the plurality of equipment 101 to 106 to match a timing at which each of the plurality of periods t1 to t3 elapses after a start of the control period T.

In the power control system 1 according to the present embodiment, the HEMS 200 transmits the control information A to F for controlling each of the plurality of equipment 101 to 106 to each of the plurality of equipment 101 to 106, on the basis of the control period T.

At this time, the HEMS 200 classifies the plurality of equipment 101 to 106 into a plurality of groups G1 to G3, on the basis of the data amounts Da to Df of the control information A to F. The HEMS 200 transmits the control information A to F at a timing different depending on each group, to the equipment classified into each of the plurality of groups G1 to G3. Specifically, the HEMS 200 determines that each time point at which the control period T is equally divided into three is a transmission timing of the control information A to F to correspond to the three groups G1 to G3. After a start of the control period T, the HEMS 200 disperses the transmission timings of the control information A to F to a time point at which each of the periods t1 to t3 obtained by equally dividing the control period T elapses, and transmits the control information A to F to the plurality of equipment 101 to 106.

Figure 5:
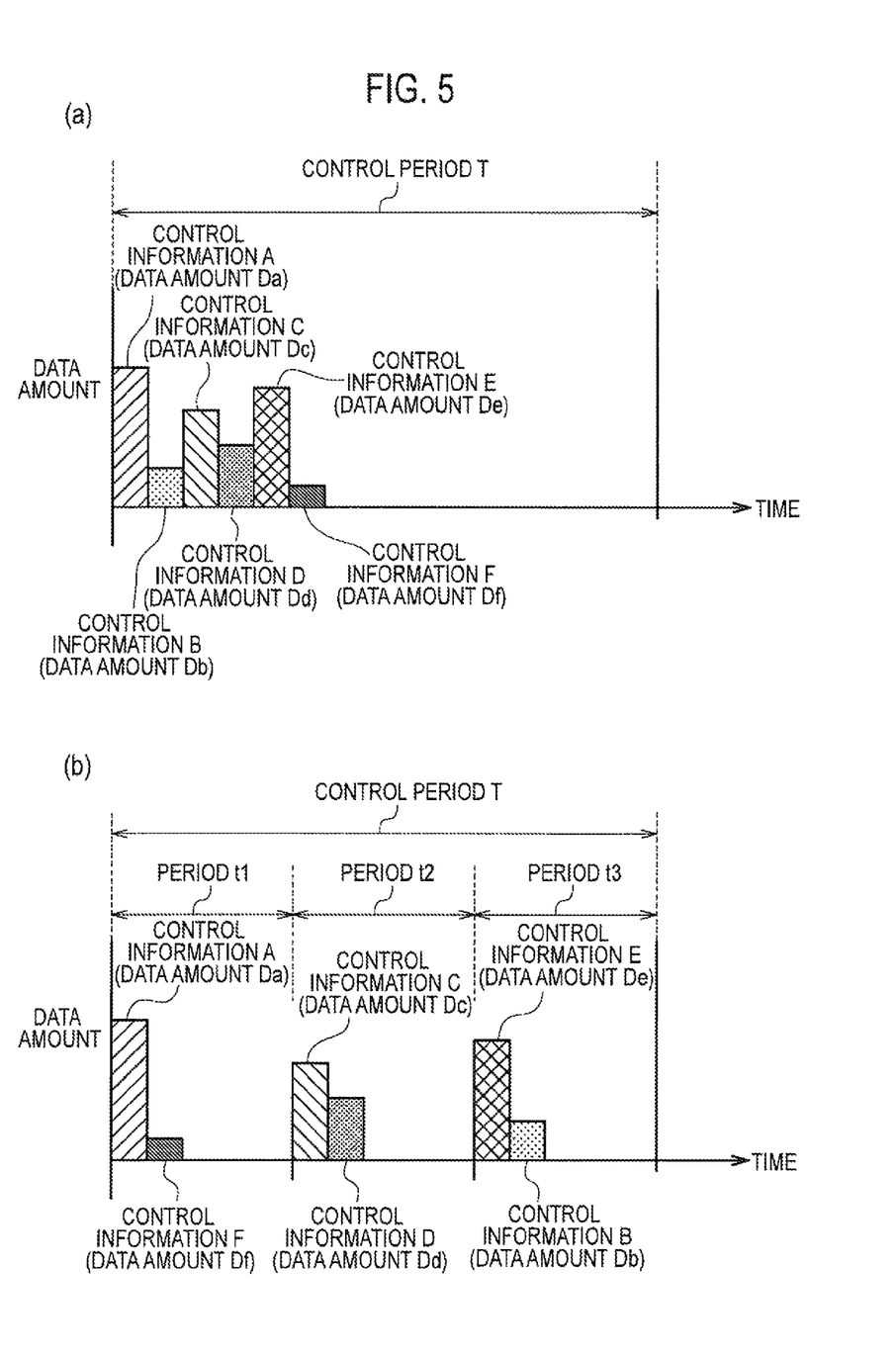
FIG. 5(a) is an image when control information is transmitted when a plurality of equipment are not classified in a plurality of groups.
FIG. 5(b) is an image when the control information is transmitted in the first embodiment.

In this case, FIG. 5(a) shows an image when the control information A to F are transmitted when the plurality of equipment 101 to 106 are not classified into a plurality of groups, and FIG. 5(b) shows an image when the control information A to F are transmitted in the present embodiment. In FIG. 5(a) and FIG. 5(b), a horizontal axis indicates a time, and a vertical axis indicates a data amount.

As shown in FIG. 5(a), when the plurality of equipment 101 to 106 are not classified into a plurality of groups, in the control period T, the timings at which the control information A to F are transmitted are concentrated at a timing at which the control period T starts. As a result, in the power control system 1, the congestion may be generated in the radio communication network 100.

On the other hand, as shown in FIG. 5(b), in the HEMS 200 according to the present embodiment, the control information A to F are transmitted to the plurality of equipment 101 to 106 at timings of the periods t1 to t3 equally divided into each of the plurality of groups G1 to G3. That is, according to the HEMS 200, the control information A to F are transmitted to each of the plurality of equipment 101 to 106 at the timings of the periods t1 to t3 dispersed in each group, and thus, unlike the conventional technology, it is possible to ensure that the timings to transmit the control information are not concentrated.

In this way, according to the embodiment-based HEMS 200, even when the control information A to F for controlling the plurality of equipment 101 to 106 are regularly transmitted, it is possible to reduce the generation of the congestion in the radio communication network 100.

Second Embodiment

Next, the configuration of the HEMS 200 according to a second embodiment of the present invention will be described. The present embodiment differs only, from the above-described embodiment, in the configuration in which the HEMS 200 classifies the plurality of equipment 101 to 106 into the plurality of groups G1 to G3, and thus, the description proceeds with a focus on the difference.

Figure 6:
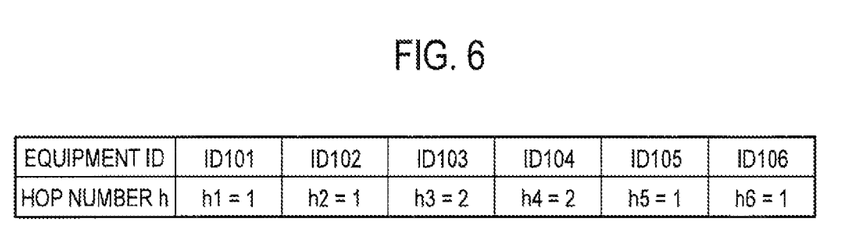
FIG. 6 is a table showing information stored in a storage unit according to a second embodiment.

In the present embodiment, the storage unit 220 stores equipment ID for identifying equipment and a hop number h in an associated manner, as shown in FIG. 6.

The equipment ID is identification information for identifying the equipment 101 to 106 provided in the consumer 10. The equipment ID is assigned by the HEMS 200 when the equipment 101 to 106 are newly initially registered with the power control system 1. Alternatively, a MAC address unique to equipment may be handled as the equipment ID. In either case, the HEMS 200 needs to comprehend the equipment ID or the MAC address of each of the connected equipment in order to communicate therewith.

The hop number h indicates the number of one or a plurality of relay apparatuses 11 to 19 that are passed through in the communication between the HEMS 200 and the plurality of equipment 101 to 106. The HEMS 200 is capable of acquiring the hop number h by using a route information acquisition command such as "Traceroute". The HEMS 200 may regularly acquire the information indicating the hop number h corresponding to each of the plurality of equipment 101 to 106 by using the above-described command, and may acquire the same by including the same in the response information transmitted from the equipment 101 to 106.

Specifically, the control unit 240 acquires the data amounts Da to Df for each item of the control information A to F when the control information A to F are transmitted to the plurality of equipment 101 to 106. Further, with reference to the storage unit 220, the control unit 240 acquires the hop numbers h "h1 to h6" stored in association with the equipment IDs "ID 101 to 106" of the plurality of equipment 101 to 106.

The control unit 240 multiplies the data amount Da by the hop number h1 to acquire a multiplication result DA. Likewise, the control unit 240 multiplies each of the data amounts Db to Df by each of the hop numbers h2 to h6 to acquire multiplication results DB to DF. The control unit 240 compares each of the multiplication results DA to DF to classify the results into the three groups G1 to G3. At this time, the control unit 240 performs classification so that a difference in total value of the multiplication results classified into each of the three groups G1 to G3 is minimum.

The control unit 240 specifies the control information A to F corresponding to each of the three groups G1 to G3 on the basis of the multiplication results DA to DF classified into the three groups G1 to G3.

Further, the control unit 240 specifies the plurality of periods t1 to t3 corresponding to the three groups G1 to G3. The control unit 240 transmits the control information A to F corresponding to each of the three groups G1 to G3 to the plurality of equipment 101 to 106 to match a timing at which each of the plurality of periods t1 to t3 elapses after a start of the control period T. That is, the control unit 240 disperses the transmission timings of the control information A to F corresponding to each of the three groups G1 to G3, after a start of the control period T, to a timing at which each of the plurality of periods t1 to t3 elapses, and transmits the control information A to F to the plurality of equipment 101 to 106.

The HEMS 200 according to the present embodiment classifies the plurality of equipment 101 to 106 into the plurality of groups G1 to G3 in consideration not only of the data amounts Da to Df of the control information A to F transmitted to each of the plurality of equipment 101 to 106 but also of the hop numbers h1 to h6 in the radio communication network 100. Therefore, according to the embodiment-based HEMS 200, the communication load in the radio communication network 100 is accurately comprehended and the control information A to F are transmitted, and thus, it is possible to surely reduce the generation of the congestion in the radio communication network 100.

Third Embodiment

Next, the configuration of the HEMS 200 according to a third embodiment of the present invention will be described. The present embodiment differs only, from the above-described embodiment, in the configuration in which the HEMS 200 classifies the plurality of equipment 101 to 106 into the plurality of groups G1 to G3, and thus, the description proceeds with a focus on the difference.

The control unit 240 according to the present embodiment randomly selects equipment included in the plurality of equipment 101 to 106 and classifies the plurality of equipment 101 to 106 into a plurality of groups.

Specifically, the control unit 240 uses a random number to select the equipment ID, one at a time, of the equipment 101 to 106 stored in the storage unit 220, and classifies the plurality of equipment 101 to 106 into the plurality of groups G1 to G3.

The control unit 240 may classify the plurality of equipment 101 to 106 into the plurality of groups G1 to G3 on the basis not only of the equipment ID but of a network address (for example, PAN_ID defined in the ZigBee standard) or an IP address, etc., assigned to the equipment 101 to 106. That is, the control unit 240 may use any information as long as identification information to identify the plurality of equipment 101 to 106.

In this case, some equipment, among the plurality of equipment 101 to 106, may be provided at a specific location (for example, a specific room). In such a case, even when the HEMS 200 classifies the plurality of equipment 101 to 106 into the plurality of groups G1 to G3 on the basis of the data amounts Da to Df of the control information A to F, the control information may be concentrated in a relay apparatus provided at a specific location.

According to the embodiment-based HEMS 200, when the equipment included in the plurality of equipment 101 to 106 is randomly selected from the equipment ID or the identification information such as a network address, the plurality of equipment 101 to 106 are classified into a plurality of groups, and thus, even when some equipment are provided at a specific location (for example, a specific room), it is possible to prevent a situation where the control information is concentrated in a relay apparatus provided at the specific location. That is, according to the embodiment-based HEMS 200, it is possible to reduce the generation of the congestion in the radio communication network 100 when the control information A to F are transmitted.

Other Embodiments

The present invention is explained through the above-described embodiments, but it must not be understood that this invention is limited by the statements and the drawings constituting a part of this disclosure. From this disclosure, various alternative embodiments, examples, and operational technologies will become apparent to those skilled in the art.

For example, in the above-described embodiments, the description proceeds with a case where in the power control system 1, the radio communication network 100 includes an ad hoc network; however, the communication network constructing the power control system 1 is not limited to an ad hoc network, and various types of radio communication networks may be applicable. Further, the power control system 1 may be configured by a wired communication network.

Further, in the above-described embodiments, the description proceeds with an example where the housing is adopted as the consumer and the HEMS 200 is adopted as the power control apparatus. However, the power control apparatus may be BEMS (Building and Energy Management System) that manages a building, may be FEMS (Factory Energy Management System) that manages a factory, and may be CEMS (Community Energy Management System) that manages a region, for example.

As described above, needless to say, the present invention includes various embodiments and the like not described here. Moreover, it is also possible to combine the above-described embodiments and modifications. Therefore, the technical range of the present invention is to be defined only by the inventive specific matter according to the adequate claims from the above description.

It is noted that the entire content of Japanese Patent Application No. 2011-271750 (filed on Dec. 12, 2011) is incorporated in the present specification by reference.

INDUSTRIAL APPLICABILITY

According to the present invention, it is possible to provide a power control apparatus that reduces the generation of a congestion in a communication network when control information for controlling equipment is regularly transmitted, a power control system, and a control method.

The invention claimed is:

1. A power control apparatus that is communicatively connected to a plurality of equipment provided in a consumer and performs control on a power management of the plurality of equipment, wherein the power control apparatus is connected, via an ad hoc network, to the plurality of equipment, and wherein the power control apparatus comprises:
a transmitter, and
a controller configured to transmit control information for controlling each of the plurality of equipment to each of the plurality of equipment, wherein the controller is configured to
classify the plurality of equipment into a plurality of groups based on an actual data amount of the control information transmitted to each of the plurality of equipment so as to minimize a difference between multiplication results for each of the plurality of groups, each of the multiplication results being obtained, for each of the plurality of groups, by multiplying total actual data amount of the control information and a number of hops required to transmit the control information, and
control the transmitter to transmit the control information for each of the plurality of groups at different timing in a predetermined period.

2. The power control apparatus according to claim 1, wherein the controller randomly selects equipment included in the plurality of equipment and classifies the plurality of equipment into the plurality of groups.

3. The power control apparatus according to claim 1, wherein the controller classifies the plurality of equipment into the plurality of groups on the basis of identification information assigned to each of the plurality of equipment.

4. The power control apparatus according to claim 1, wherein the ad hoc network is a ZigBee network.

5. The power control apparatus according to claim 4, wherein the controller transmits the control information in a period defined in a ZigBee protocol.

6. A power control system, comprising:
a plurality of equipment provided in a consumer; and
a power control apparatus that communicatively connects to the plurality of equipment and performs control on a power management of the plurality of equipment, wherein the power control apparatus includes
a transmitter, and
a controller configured to transmit control information for controlling each of the plurality of equipment to each of the plurality of equipment, wherein the controller is configured to
classify the plurality of equipment into a plurality of groups based on an actual data amount of the control information transmitted to each of the plurality of equipment so as to minimize a difference between multiplication results for each of the plurality of groups, each of the multiplication results being obtained, for each of the plurality of groups, by multiplying total actual data amount of the control information and a number of hops required to transmit the control information, and control the transmitter to transmit the control information for each of the plurality of groups at different timing in a predetermined period.

\* \* \* \* \*